United States Patent
Lamy-Bergot et al.

(10) Patent No.: US 9,444,600 B2
(45) Date of Patent: Sep. 13, 2016

(54) METHOD AND SYSTEM OF COMMUNICATION USING DYNAMIC MODULATION AND CODING SCHEMES ON WIDE BAND HF COMMUNICATION CHANNELS

(71) Applicant: THALES, Neuilly sur Seine (FR)

(72) Inventors: Catherine Lamy-Bergot, Gennevilliers (FR); Sebastien Herry, Gennevilliers (FR); Bertrand Marin, Gennevilliers (FR)

(73) Assignee: Thales, Courbevoie (FR)

(*) Notice: Subject to any disclaimer, the term of this patent is extended or adjusted under 35 U.S.C. 154(b) by 145 days.

(21) Appl. No.: 14/351,103

(22) PCT Filed: Oct. 9, 2012

(86) PCT No.: PCT/EP2012/069960
§ 371 (c)(1),
(2) Date: Aug. 20, 2014

(87) PCT Pub. No.: WO2013/053703
PCT Pub. Date: Apr. 18, 2013

(65) Prior Publication Data
US 2014/0369284 A1 Dec. 18, 2014

(30) Foreign Application Priority Data
Oct. 10, 2011 (FR) ...................................... 11 03083

(51) Int. Cl.
*H04L 1/00* (2006.01)
*H04L 5/00* (2006.01)

(52) U.S. Cl.
CPC ........... *H04L 5/0053* (2013.01); *H04L 1/0001* (2013.01); *H04L 1/0003* (2013.01); *H04L 1/0009* (2013.01); *H04L 1/0025* (2013.01); *H04L 1/0028* (2013.01); *H04L 1/0071* (2013.01); *H04L 5/006* (2013.01); *H04L 5/0046* (2013.01)

(58) Field of Classification Search
CPC ....... H04L 47/10; H04L 47/11; H04L 47/12; H04L 47/13; H04W 72/04; H04W 72/05; H04W 72/06; H04W 80/04; H04W 80/05; H04W 80/06; H04W 80/07; H04W 80/08; H04W 84/08; H04W 84/09; H04W 84/10
USPC ................ 370/329, 431, 328, 341, 229, 230
See application file for complete search history.

(56) References Cited

U.S. PATENT DOCUMENTS

| | | | | |
|---|---|---|---|---|
| 4,780,885 A | * | 10/1988 | Paul | H04B 7/005 375/267 |
| 2012/0040618 A1 | * | 2/2012 | Furman | H04W 28/18 455/62 |
| 2012/0309330 A1 | | 12/2012 | Lamy-Bergot et al. | |

FOREIGN PATENT DOCUMENTS

FR    2968149 A1    6/2012

OTHER PUBLICATIONS

M.B. Jorgenson, et al., "Meeting Military Requirements for Increased Data Rates at HF", 21st Century Military Communications Conference Proceedings, Oct. 22, 2000, pp. 1149-1153, vol. 2, IEEE, Piscataway, NJ, USA, XP010532080.

(Continued)

*Primary Examiner* — Dady Chery
(74) *Attorney, Agent, or Firm* — Baker & Hostetler LLP

(57) ABSTRACT

A method and system of communication in a wide band high frequency HF communication system is disclosed. The system includes at least n communication channels, an interleaver common to the n communication channels, a means for determining the quality of communication of each of the n communication channels. At least the following information is introduced into the structure of the frame of the data at the level of an autobaud: an item of information about the modulation employed on each of the n communication channels $ch_n$, an item of information about the interlever common to the n communication channels, the corrector code FEC employed, the number of communication channels employed (n) as well as for each one its identifier $id_n$. The modulation is chosen on channel n, a common coding and interleaving are operated on the n channels, and the information introduced in the shared autobaud is transmitted.

12 Claims, 5 Drawing Sheets

(56) References Cited

OTHER PUBLICATIONS

S.E. Trinder, et al., "Optimisation of the Stanag 5066 ARQ Protocol to Support High Data Rate HF Communications", 2001 Proceedings of Communications for Network-Centric Operations: Creating the Information Force, Oct. 28, 2001, pp. 482-486, vol. 1, IEEE, New York, New York, XP010579059.

* cited by examiner

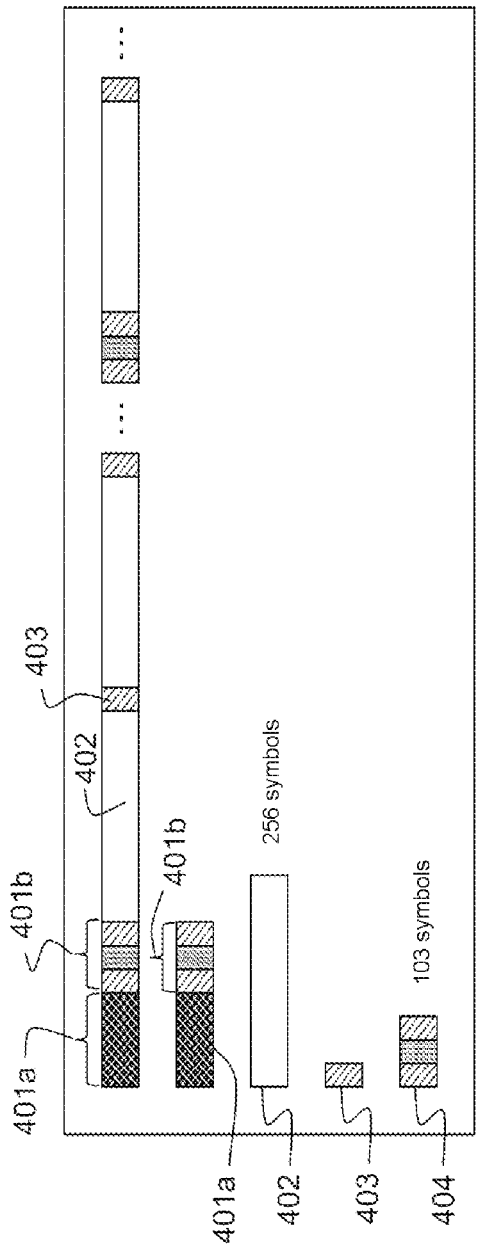
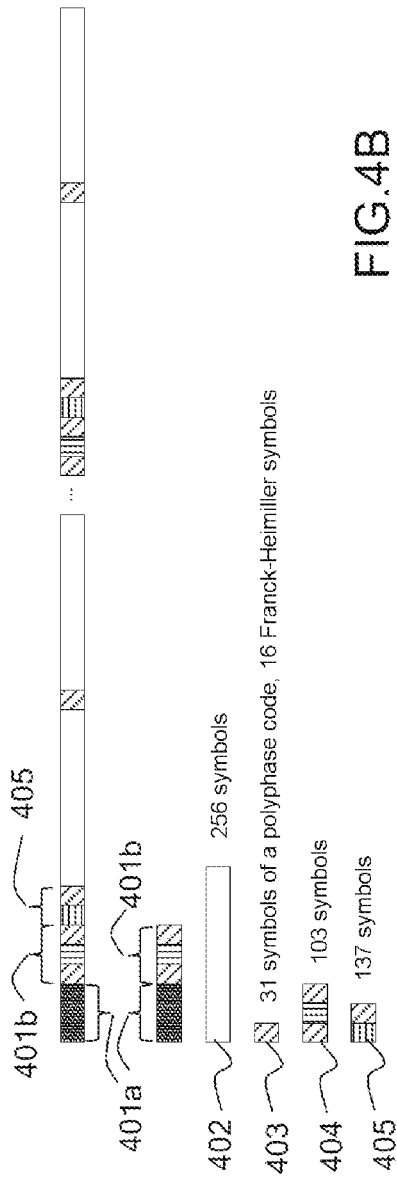

| Data bit rate | 3 Bit Mapping |
|---|---|
| reserved | 000 |
| 3200 | 001 |
| 4800 | 010 |
| 6400 | 011 |
| 8000 | 100 |
| 9600 | 101 |
| 12800 | 110 |
| reserved | 111 |

If '000' indicates passage to the MIL 188-110 B annex F case (BLI mode) and that the second tribit therefore needs to be read from the table opposite:

| Inter-interleaving length | 3 Bit Mapping | Name |
|---|---|---|
| Illegal: see C.5.2.1.2 | 000 | |
| 1 frame | 001 | Ultra short (UC) |
| 3 frames | 010 | Very short (TC) |
| 9 frames | 011 | Short (C) |
| 18 frames | 100 | Average (M) |
| 36 frames | 101 | Long (L) |
| 72 frames | 110 | Very long (L) |
| Illegal: see C.5.2.1.2 | 111 | |

Channel 0

| Bit rate (kbps) | D0,D1,D2 | 3 Bit Mapping |
|---|---|---|
| 9.6 | 0,0,2 | 001 |
| 12.8 | 0,2,0 | 010 |
| 16.0 | 0,2,2 | 011 |
| 19.2 | 2,0,0 | 100 |

Channel 1

| Inter-interleaving | D0,D1,D2 | 3 Bit Mapping |
|---|---|---|
| (UC) | 0,0,2 | 001 |
| (TC) | 0,2,0 | 010 |
| (C) | 0,2,2 | 011 |
| (M) | 2,0,0 | 100 |
| (L) | 2,0,2 | 101 |
| (TL) | 2,2,0 | 110 |

FIG.5

METHOD AND SYSTEM OF COMMUNICATION USING DYNAMIC MODULATION AND CODING SCHEMES ON WIDE BAND HF COMMUNICATION CHANNELS

CROSS-REFERENCE TO RELATED APPLICATION

This application is a National Stage of International patent application PCT/EP2012/069960, filed on Oct. 9, 2012, which claims priority to foreign French patent application No. FR 1103083, filed on Oct. 10, 2011, the disclosures of which are incorporated by reference in their entirety.

FIELD OF THE INVENTION

The subject of the present invention relates to a method and a system for the dynamic use of different modulation and coding schemes on n separate paths or channels in a wideband high frequency (HF) communication system.

BACKGROUND

In the present description, the words path or channel are used interchangeably to denote a channel for propagating and transmitting the data. These channels will be able to be accumulated to provide wideband communication.

HF links notably provide a capacity beyond the line of sight or BLOS that allows long or even very long haul communications to be implemented without requiring the use of a satellite.

The technical context of the present invention relates more particularly to the use of high speed HF links (for example bit rates>19.2 kb/s) as dealt with in the patent application filed by the applicant under the number FR 10/04650, which proposes considering the use of a plurality n of conventional channels or paths with a typical width of 3 kHz of passband.

The long haul communication capability (for BLOS) of the HF links is reliant on the reflection of the HF waves (which typically range from 2 to 30 MHz) on the layers of the ionosphere, layers that have qualities that are not stable in time and space, which leads to strong variations in the propagation channel. To this instability of the channel is also added the ever-possible presence of various intentional or unintentional sources of scrambling, particularly at night when the transmitting portion of the HF spectrum is not as great.

Despite its instability, this channel has the benefit of transmitting long haul communications without it being first of all necessary to deploy a complicated or expensive infrastructure, in contrast to satellite communications, for example. If its better stealth is likewise considered, this explains why professionals seek to increase the bit rates provided on the HF links. A solution has been proposed in the aforementioned patent application for considering the use of a plurality n of 3 kHz channels, which may or may not be contiguous, so as to go further and provide higher useful bit rates for users of the HF band.

The modulation and coding schemes used in some standards are of monocarrier modulation type using a modulation and coding scheme that is reliant on a given constellation, for example PSK (phase shift keying) or QAM (Quadrature Amplitude Modulation) modulation, and a given correction code, for example a convolutional code, which may or may not be punctured, defining a useful bit rate. In the case of extension with a lower side band or BLI, two paths share the same digital modulation, with an even bit/odd bit distribution on one or other path, and hence the same useful bit rate, the correction code being common.

It thus appears that when there are a plurality of available transmitting channels distributed over a relatively wide band, for example of 200 kHz, and wideband transmission allowing high bit rates, greater than 32 kb/s, to be reached is performed, the various paths distributed over this wide band will not be able to see the same imperfections in the propagation channel. Typically, fading will be different, and intentional or unintentional scrambling will differ.

The use of a single modulation and coding scheme, i.e. one and the same constellation and an identical or shared correction code, will not allow the best adaptation of capabilities of the transmission channel. In order to succeed in transmitting on a path that has a high level of fading, one solution involves reducing the useful bit rate on all of the paths, including those that do not have high levels of fading.

Moreover, the generalization of an approach such as the one reserved for BLI therefore does not allow effective combat of the loss of a path. The reason is that, for BLI, the sudden degradation of a path causes the system to fall back to communication in a mode with a single useful band (called upper side band mode BLU), which creates the problem of a strong reduction in bit rate.

The solutions that exist in the prior art or the immediate declension of said solutions in the case of n paths are of two types that are summarized below.

A first solution, shown schematically in FIG. 1 in the case in which the use of two channels simultaneously is considered, involves processing the bands separately, each one typically being provided with a dedicated modem implementing the current 3 kHz or 6 kHz standard, with a change to wideband processing solely at the level of the radio, by means of summation of the various carriers. The odd bits will be processed via the channel $Ch_1$, chain 101, and the even bits via the channel $Ch_0$, chain 102. Equally, at reception, two processing paths 103 and 104 will be used to process the even and odd data bits. This type of solution will not allow there to be a diversity gain, since each path will in fact be processed separately. In the case in which a single path is under consideration, with an approach of monocarrier type, a single modulation and coding scheme is used, and it is management of link establishment/link maintenance (ALE/ALM) type that can introduce a dynamic character. The waveform under consideration is generally autobaud, which means that the waveform includes a specific transmission capability, commonly called separately decodable and demodulable autobaud field, which indicates the modulation and coding scheme used for the rest of the frame (or up until the next autobaud field), the change of bit rates being remotely controlled by the upper layers, typically by an ARQ controller.

In the description that follows, the processing chain being known to a person skilled in the art, the designations in the figures will be as follows:

for the transmission chain in FIGS. 1, 2 and 3, FEC: the error correction code, I: the interleaving, SYM: the symbol formation, FR: the framing step, M: the modulation step; the step SC in the diagram for scrambling.

for the reception chain in FIGS. 1, 2 and 3: g(t) the filtering, SYN: the synchronization, BDFE: the frame equalization step, SYNP: the prediction of the synchronization, DI: the deinterleaving, D: the decoding of the data.

This first type of solution (with coding and modulation processing separated on a path-by-path basis) does not allow full advantage to be drawn from the fact of using parallel paths, because such an approach does not bring about any diversity gain. It is moreover one of the reasons for which the BLI solution, combining two channels, as proposed in the MIL118-110B standard that is known to a person skilled in the art, introduces coding diversity by pooling the error correction coding and interleaving stage. However, this solution does not ensure the capability of easily operating with a blocked path (that is to say that the path is not transmitting, either on account of the propagation itself or because the channel is occupied by an intentional or unintentional source of scrambling) when the interleaving, bit rate, etc., or even number-of-paths information is variable because this information that is required for correctly decoding the frame is shared between the various paths. In the absence of appropriate signaling (typically in order to establish what has been lost), the result in the (conventional) case in which two paths are used is that the data transmitted on the two channels are lost when one is blocked because the standard approach uses the two paths in coupled fashion, by using the autobaud fields of the two paths to define the same and single modulation and coding scheme to be used on these two paths (the even bits traveling on channel 0 and the odd bits on channel 1).

A second solution, shown schematically in FIG. 2, involves extending the principle of the BLI by pooling the FEC correction code 205 and the interleaver 206 with a plurality of paths Chi, at the processing chains 201, 202, in order to provide a coding diversity gain, and by using the same modulation parameters on the various modem paths, before the frequency transposition 209 and likewise the summation 210 of the various carriers in the wideband radio. As mentioned above, this solution will not allow adaptation to the propagation condition differences of each of the channels under consideration. On reception, the pooling will be found for all the paths Ch of the deinterleaver 207 and the decoding 208. This second type of solution (extension of the BLI solution) which involves the use of the same modulation on each of the paths by sharing the correction code and the interleaver, will therefore allow a coding diversity gain, contrary to the first solution but on the other hand will render the system sensitive to the loss of one of the paths, as in the BLI solution with two combined paths. The reason is that, in the BLI solution, it will be noticed that the sharing of the autobaud information on the various paths (for BLI, channel 0 transmits the bit rate information, and channel 1 transmits the interleaver used), which is the information that allows the demodulator to know the mode that is used, risks making it impossible to use the various paths when one of them is lost completely, for example in the case of scrambling. This point, which was already a problem in BLI mode, and which had therefore led to the implementation of a mechanism for returning to the BLU monopath case in the event of a problem, becomes problematical in a context in which there is a change to n paths, since the probability of having a blocked channel increases greatly. Such a mechanism would therefore become very unstable and inefficient a priori.

None of the two approaches that have been set out above allows efficient use of the n paths in parallel, and combination of at least the various following advantages: improvement of the transmission owing to coding diversity, minimal protection of the autobaud information against the risk of blocked channels, capability of having different bit rates on the various paths, on the basis of the quality of the propagation channel under consideration.

The document by M. Jorgenson et al. entitled "Meeting military requirements for increased data rates at HF", MILCOM 2000, 21st Century Military communications Conference Proceedings 22-25 Oct. 2000, PISCATAWAY, N.J., USA, IEEE, XP010532080 discloses the use of independent modulations on a plurality (n) of channels in one and the same system, with the same modulation parameters for each channel, and a correction code that is common to all channels.

The document by S. Trinder et al. entitled "Optimisation of the stanag 5066 ARQ Protocol to support high data rate HF communications", MILCOM 2001, Proceedings. Communications for Network-Centric Operations: creating the information Force. XP010579059 discloses a system in which the addition of redundancy allows the success of reception of the information to be optimized.

One of the problems posed is therefore that of having, for one and the same communication, efficient transmission on n paths in parallel, each of these paths seeing a potentially different propagation channel, while ensuring that the loss of one of the paths or of a plurality of these paths does not destroy the whole communication.

SUMMARY OF THE INVENTION

To solve at least this problem, the method according to the invention is reliant notably on the implementation of a protocol for dynamic choice of the modulation and coding schemes (MCS) independently on a path-by-path basis within a context of multifrequency transmission that is suited to the HF medium.

The subject of the present invention relates to a method for communication in a wideband high frequency HF communication system comprising a transmitter for an HF signal and a receiver, at least n communication channels $ch_n$, an FEC error correction code and an interleaver that are common to the n channels, a means allowing determination of the communication quality Qn provided by each of the n channels $ch_n$, the data being transmitted in the form of a frame comprising an initial synchronization preamble and a standard autobaud followed by a block of data characterized in that it has at least the following steps, which are performed in order to allow the use of n channels in parallel, sharing one and the same coder and one and the same interleaver in order to benefit from frequency diversity protection, while allowing the use of different modulations on the n channels and providing redundancy on the information pertaining to coding, interleaving, modulation by channel, number of channels:

a step that involves introducing, into the structure of the frame of the data in the transmitted HF signal, an autobaud extension after the standard autobaud, said extension preamble having at least the following information:
    a piece of information about the modulation used on each of the n channels $ch_1, \ldots, ch_n$,
    a piece of information about the interleaver that is considered common to the n channels,
    the FEC correction code used, which is common to the n channels,
    the number of channels used (n), and for each the identifier $id_1, \ldots, id_n$ thereof that allows them to be ordered,
  a step of choosing the modulation on a channel n on the basis of the link quality of said channel,
  a common coding and interleaving operation on the n channels,
  the transmission of the information introduced into the shared autobaud at the receiver.

By way of example, the method has a step that involves inserting the autobaud extension preamble after a standard autobaud that is itself regularly inserted into the data frame.

By way of example, said frame comprises a first standard portion composed of two tribits followed by a mini-probe and a second portion made up of n tribits followed by a mini-probe, with, by way of example, n equal to four tribits.

By way of example, the information on the modulation used is a piece of bit rate information.

A propagation channel $ch_k$ may carry the bit rate information for the communication channels $ch_k$ and $ch_{k+1}[n]$.

By way of example, the choice of modulation used on the channel is made by taking into account the quality $Q_n$ of the communication channel $ch_n$.

By way of example, the link quality of a communication channel is estimated by executing at least one of the following steps:
- measurement of power of the received signal, in the absence of communication, in each channel considered by the system,
- attribution of a quality grade to each of said channels by comparing the value measured for the power with one or more threshold values,
- selection of the n channels having the highest grade values.

The width of a channel may be 3 kHz or, more generally, t kHz, t being a given real number.

According to an implementation variant, the frame structure is defined in the ST4539 standard or the MIL 188-110B standard and the method uses the value '111' of the first tribit of the autobaud in order to signal extended autobaud operation to the receiver and in the course of the method four additional tribits are defined, or eight symbols for forming an autobaud of 137 symbols and thus constituting the extended autobaud, said tribits being protected by a correction code.

It is possible to use various modulations, possibly coded, on the various channels under consideration.

The invention also relates to a wideband high frequency communication system having at least one HF transmitter and at least one HF receiver that are suited to transmitting and receiving a signal having an HF waveform, characterized in that:
- said HF receiver has means for determining n frequency channels, on which it will transmit an HF signal,
- said receiver has means for evaluating the transmission quality Qn of a channel,
- said HF transmitter moreover has means allowing the generation of an extended and shared autobaud comprising at least the following information:
  - a piece of information about the modulation used on each of the n channels $ch_1, \ldots, ch_n$,
  - a piece of information about the interleaver that is considered common to the n channels,
  - the FEC correction code used, which is common to the n channels,
  - the number of channels used (n), and for each the identifier idn thereof that allows them to be ordered,
- the system comprising a return path allowing the information about the quality of the channel to be sent back up to the HF transmitter.

It is likewise possible to have a means for measuring the quality of the communication channels at the transmitter so as to choose as preferred channels those that are of good quality for the transmitter and the receiver. At the transmitter end, this measurement can be effected by measuring the power of the signal received at the transmitter, in the absence of communication, in each channel under consideration by the system, or in the event of the system operating in duplex mode, by using quality levels measured when the transmitter was in reception mode. In the case of half-duplex use as often occurs in HF, it is possible to take the information that is present at reception in order to use it for transmission as well.

BRIEF DESCRIPTION OF THE DRAWINGS

Other features and advantages of the device according to the invention will become more apparent on reading the following description of an exemplary embodiment given as an illustrative and nonlimiting implementation example with appended figures, in which:

FIGS. 4A and 4B show a frame structure according to the prior art and a frame structure integrating the method according to the invention, and FIG. 5 shows a composition example for the fields of the autobaud for two low bit rate modes.

DETAILED DESCRIPTION

Figure 1:
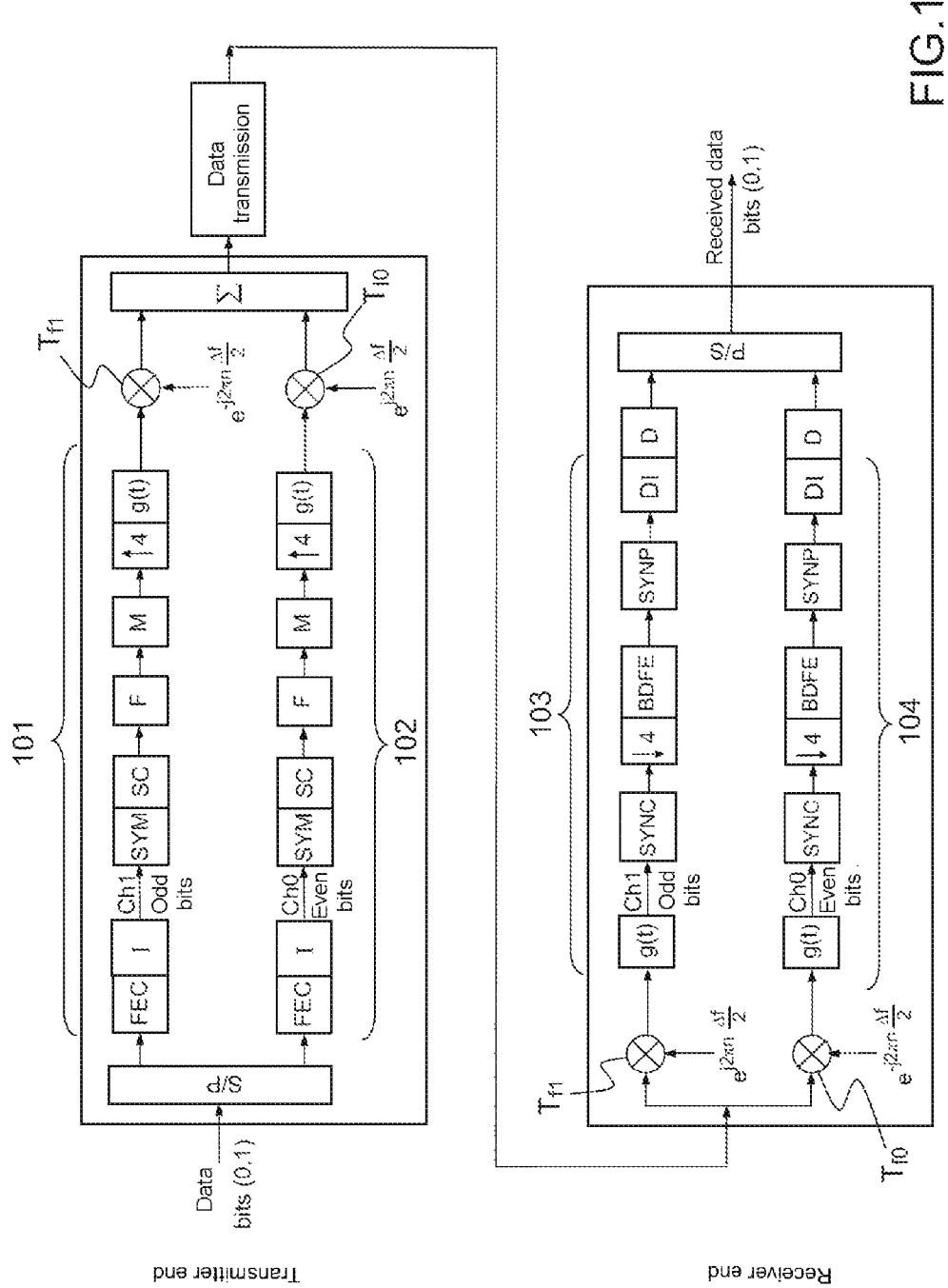
FIG. 1 shows an architecture example for a system for transmission and reception according to the prior art.
Figure 2:
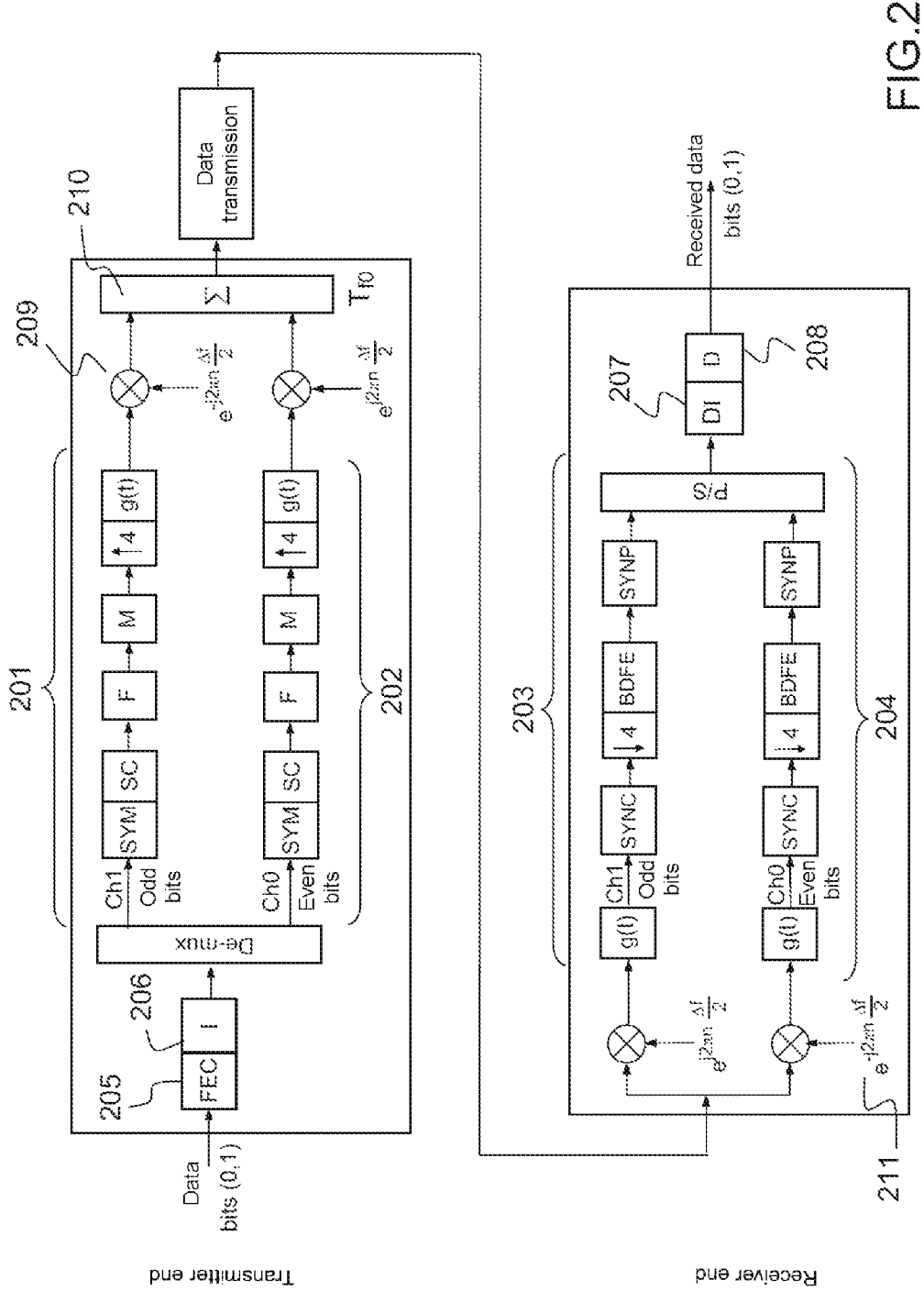
FIG. 2 shows a second implementation example of the prior art.

The method and system proposed in the present invention are based on the assumption that there is a set of n channels of conventional HF type, for example 3 kHz channels (which may or may not be contiguous) and a return path that is capable of informing the system of the quality Q of the propagation channel for each of the channels.

These conditions are satisfied, by way of example, if following the approach described in the Thales invention proposal entitled "Method and system for adaptive HF band communications", filed under the number FR10/04650. The method described in this patent application notably allows dynamic selection of a set of frequency bands on the basis of the quality, at a given instant, of the transmission on these frequency bands. The bands are not necessarily contiguous but are taken from all of the frequencies allocated to a user. Any other method that allows there to be n channels may also be used. In order to obtain a piece of information about the quality Q of the propagation channel, it is possible, by way of example, to use the technique described in the aforementioned patent application. Thus, it is possible to obtain quality information corresponding to a noise power or to a signal-to-noise ratio that is transmitted by the receiver to the transmitter, from measurements performed at reception, either on the signal-to-noise ratio estimated on pilot symbols of the received frame, for example, or for the channels in which there is no traffic, by integrating the noise on the sub-band under consideration. In practice, these measured values will be converted into a discrete value taken from a predefined set S of values that qualify the link. By way of example, the power of the received signal is measured, in the absence of transmission in each channel. This measurement is carried out by the receiver using an analog-to-digital converter with known dynamics and saturation values, which is not shown, because it is not part of the subject matter of the present invention. The grade for the quality of the transmission can likewise take into account an average power value for the signal in the course of a period of time in the past. This average power can be used only if measured over a period of time for which the transmission and reception conditions are comparable to those observed for the measurement of the instantaneous power of the signal. It is also possible to weight the measurement of the instantaneous power of the signal, by means of preferential allocations to various services. By way of example, if there are frequencies attributed for exclusive use and others for shared access, it will be possible to favor the use of exclusive frequencies. Finally, if there is likewise a means for measuring the quality of the communication channels at the transmitter, it will be possible to take into account the quality measurements of the transmitter, in order to favor the channels that are likewise the best at the transmitter. This is notably beneficial when the system is operated in half-duplex mode, that is to say that the link is used alternately for transmission/reception between two sites, then for reception/transmission between these same two sites.

Once the quality of the transmission in each channel has been established, the method will fix one or more comparison threshold values to this quality grade, beyond which the channel is considered to be perturbed and therefore not available.

The example that will be given in order to illustrate the technical features implemented by the invention relates to two standards that exist for HF communications, namely the Stanag 4539 standard and the MIL STD 110-118B standard.

The implementation of the present invention notably allows the obtainment of complete interoperability with existing narrowband equipment in a BLU or BLI mode of operation. The frame format will be preserved and compatibility with the existing autobaud fields will be observed.

Figure 3:
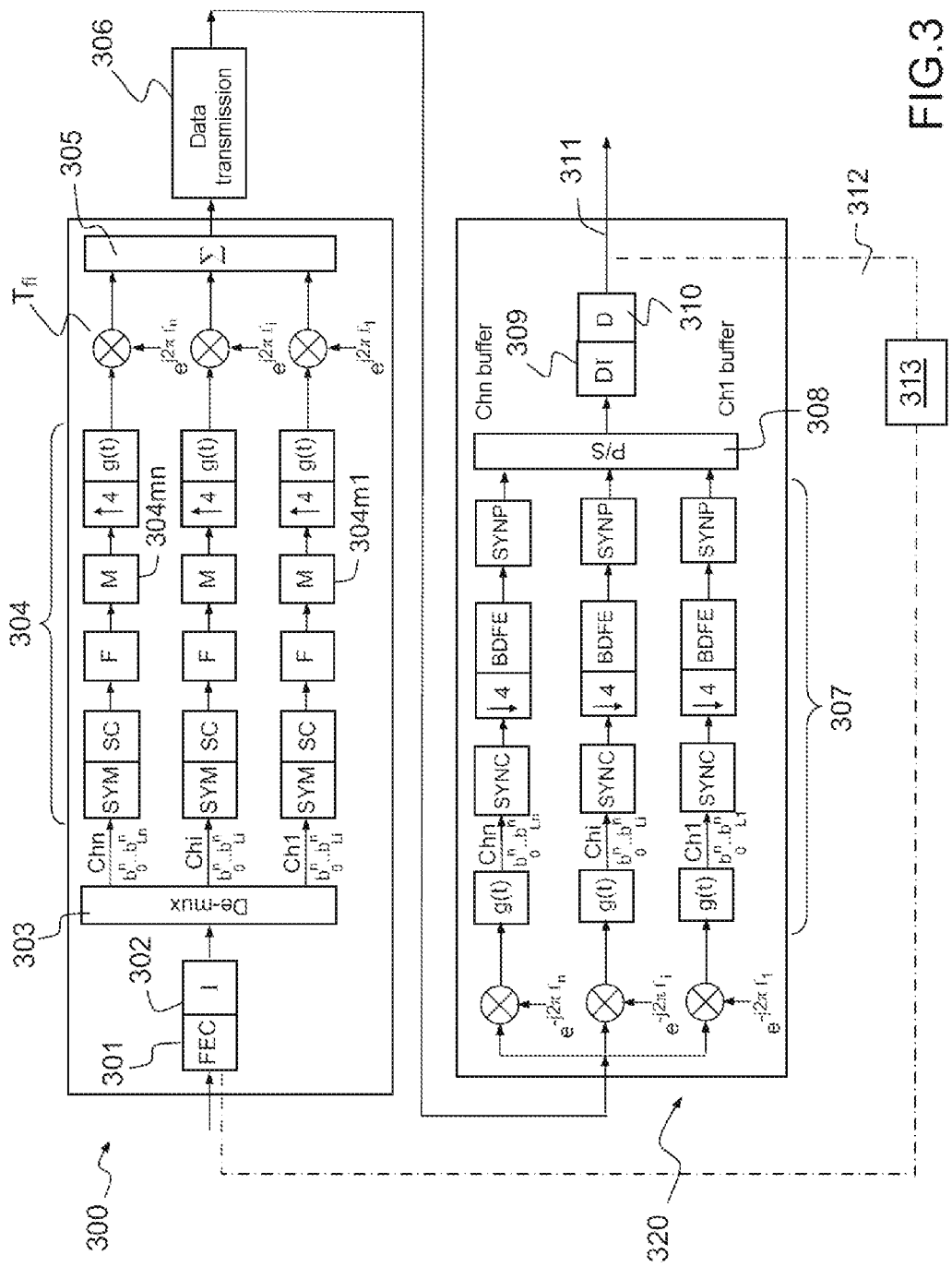
FIG. 3 shows a solution example implementing the method according to the invention comprising n paths with different and independent modulation and coding schemes.

FIG. 3 schematically shows a communication system example according to the invention comprising:

at the transmitter portion 300, binary data of the user {0, 1} pass first into an FEC correction module 301, then into an interleaver 302 before being demultiplexed 303. The demultiplexed data are then transmitted on n channels in parallel. The n channels or n paths $ch_1 \ldots ch_n$ are, by way of example, channels having a width of 3 kHz that may or may not be contiguous.

The data following processing in the transmission chain 304 comprising means known to a person skilled in the art, for example, a symbol formation means, sampling means, followed by modulation means, will then be subjected to frequency transposition, the transposition frequency Tfn being associated with a channel $ch_n$, and then will be summed 305. The resulting sum will be transmitted and the signal will be propagated 306 there by the transmission channel before being received on the receiver portion 320.

At the receiver portion 320, the received signal is firstly subjected to frequency transposition T'fi, which allows separation of the data on the n channels $ch_n$, and then the data are transmitted in a processing chain 307 that processes the data on n paths in parallel before reassembling them at a series parallel buffer 308, then transmitting the set to a deinterleaver 309 that balances the interleaver of the transmitter portion. Following deinterleaving, the data are transmitted to a correction decoding module 310 that provides binary data. The binary data thus received are then delivered to the receiver 311.

The system also has a return path 312 and a means 313 allowing determination of the quality Qi of a propagation channel for the various channels chi that are possible for transmission. The return path retransmits the quality Q of each of the n propagation channels $ch_n$ to the transmitter.

The very principle of separation into n paths or channels that are subject to different and independent propagation channels gives rise to the possibility of observing different and independent bit rates on the n channels, these bit rates therefore not being equal or fixed.

On the aforementioned assumption of the presence of n channels and the quality Q of the n propagation channels, the method proposes, in the example given below, guaranteeing the protection of the autobaud in the event of loss of a path, in order to avoid generating redundancy that is too expensive.

By using, as shown by FIG. 3, independent modulations $304mn$ on the n paths ($304m1$ for the channel $ch_1, \ldots 304mn$ for the channel $ch_n$), but by sharing the correction coding stage 301 and the interleaving 302, the method introduces coding diversity, which will allow better resistance to the imperfections of the channel (errors, losses, intentional or unintentional sources of scrambling), and will likewise allow better adaptation of the resistance and the efficiency of the modulation used to the quality of each of the paths used for the transmission.

The example given by way of illustration is restricted to application of a single correction code that is common to the various paths in order to guarantee coding diversity. Without departing from the scope of the invention, it is, however, envisageable to take into account various correction codes as will be explained further on in the description.

One of the technical features used by the method according to the invention is the presence of an extended autobaud at the frame of the data, with redundancy capability, which will allow the necessary signaling to be provided: it is owing to this extended autobaud that it will be possible to correctly reconstitute the missing information in the event of a loss of the elements of a path, the corresponding unreceived data then being input as erased upstream of the deinterleaver 309, so as to be deinterleaved and then decoded by the correction code, which, within the limits of its correction capability, will be able to correctly decode the received signal. This therefore requires the extended autobaud to transmit the information listed below in a redundant manner:

information about the modulation on each path or channel $ch_n$, the information being able to be the bit rate used, for example, the interleaver under consideration, which is common to the n channels, the correction code used, which is common to the n channels, the number of paths or channels used (n), and for each the identifier idn thereof that allows them to be ordered.

More information is introduced into the autobaud by, for example, introducing an extension into the existing autobaud, as shown in FIGS. 4A and 4B.

Once formed in this way, the frame therefore provides the following features:

it is recognized by a station according to the prior art as a standard frame that it is not capable of decoding. The standard station will therefore continue to scan the stream in search of a decodable solution without the risk of moving into error, it is recognized as a frame in an extended format for stations that incorporate the capability, with indication of the choices made in terms of modulation by channel, interleaving and type of correction code for the frame, and number of channels under consideration, and the numbering of these channels.

With such information, a station that incorporates the new capability is capable of decoding channels with different modulations on the various channels, is able to adapt itself on the fly to modification of the modulations used on all or some of the channels, and is able to adapt itself on the fly to a reduction in the number of channels or to modification of the order of the channels.

By way of example given in nonlimiting fashion, within the framework of the sought compatibility with the ST4539/MIL 188-110B standard, for bit rates higher than 3200 b/s, the value '111' of the first tribit (set of three bits) will be used in order to signal to the receiver or the transmitter of the system that operation has changed to extended autobaud mode. Consequently, a standard transmitter/receiver station will detect an unknown mode and will seek to synchronize itself to the next preamble, whereas a wide band station will know that it needs to change to extended mode and therefore to interpret the extended autobaud field.

FIG. 4A schematically shows the format of a frame structure 400 in the compatible format of the ST4539/MIL 188-110B standard.

The frame comprises a first portion 401a, 401b that respectively corresponds to an initial synchronization preamble and a standard autobaud, for example with 287 symbols, followed by a data block 402 with 256 symbols, by a mini-probe 403 with 31 symbols and by a standard autobaud 404 inserted regularly into the frame of 103 symbols.

FIG. 4B schematically shows an autobaud extension example according to the invention that involves, by way of example, inserting a preamble 405, in this example made up of 157 symbols, the preamble 405 being inserted, by way of example, into the portion at the synchronization preamble (401a, 401b). The frame extended in this manner keeps the conventional format. According to another variant implementation, the preamble 405 constituting the autobaud extension can be inserted after the standard autobaud 404.

The extended autobaud according to the present invention is divided into two portions; the first in accordance with current standards has, by way of example, two tribits followed by their mini-probe, which ensures that it can be demodulated by conventional systems, followed by a second portion made up of n tribits, followed by a mini-probe, with n being equal to four new tribits, for example. This second portion is demodulated by the conventional BDFE equalizer relying on the introduction of a final mini-probe that is identical to that of the conventional autobaud (31 symbols). The change to extended mode is signaled in this example by the first tribit positioned at the value "111" in the standard autobaud.

Thus, a station compatible with the extension of the autobaud, when receiving a signal, will look for the rest of the autobaud and interpret it. A standard station that is not equipped to recognize the extended autobaud will detect a mode that is not known to it and will seek to get hold of the next preamble regularly inserted that it is capable of recognizing.

FIG. 5 shows an embodiment of the method according to the invention that is compatible with the aforementioned current standards:

The method will therefore transmit on each path or channel $ch_n$:
- the modulation (homogeneous with the bit rate information in the current standards), and a second piece of modulation information, corresponding to the one employed on another path. In order to be able to provide at least ten modulation values, this information is coded over 4 bits: $d_0\ d_1\ d_2\ d_3$ for the modulation of the path, and $d_4\ d_5\ d_6\ d_7$ for the modulation of the second path (repetition of the initial information transmitted on the path in question),
- the identifier of the channel under consideration, coded over 3 bits: $n_0\ n_1\ n_2$.

The method likewise has the following redundant information, for example at least once on all of the n channels:
- the interleaver used, which involves interleavers from the aforementioned standards or new interleavers obtained using methods known to a person skilled in the art, for example,
- the correction code employed, FEC, whether involving correction codes from the aforementioned standards or new coders obtained using methods that are known to a person skilled in the art, for example,
- the value of the total number of channels (n) used for transmitting the signal.

For these three pieces of information, one way of proceeding involves the use of 4 bits: $i_0\ i_1\ i_2\ i_3$ and alternating once in three times, for the transmission of the interleaver information, with the value of n, and with FEC code, that is to say:

If channel $ch_k=0[3]$, i0 i1 i2 i3→number of channels used (n)

If channel $ch_k=1[3]$, i0 i1 i2→interleaver under consideration

If channel $ch_k=2[3]$, i0 i1 i2→correction code under consideration

As far as the duplication of the bit rate information is concerned, it is possible, by way of example, to have the channel $c_k$ carry the bit rate information of the channels $ch_k$ and $ch_{k+1}[n]$.

This therefore leads to the following autobaud format:
111 $d_0d_1d_2d_3+n_0n_1\ n_2\ i_0\ i_1\ i_2\ i_3\ d_4d_5d_6d_7$,
that is to say to the definition of four additional tribits (or eight symbols D3, D4, D5, D6, D7, D8 protected by the Barker code known to a person skilled in the art, for example), in order to form an extended autobaud having a size of 1+8*13+1+31=137 symbols.

This results in the new modulations that are presented in the tables below, by way of example:

| Modulation | 4 bits mapping |
|---|---|
| illegal | 0000 |
| illegal | 0001 |
| reserved | 0010 |
| reserved | 0011 |
| BPSK | 0100 |
| QPSK | 0101 |
| 8-PSK | 0110 |
| illegal | 0111 |
| illegal | 1000 |
| 16-QAM | 1001 |
| 32-QAM | 1010 |
| 64-QAM | 1011 |
| 128-QAM | 1100 |
| 256-QAM | 1101 |
| illegal | 1110 |
| illegal | 1111 |

| Channel under consideration | 3 bits mapping |
|---|---|
| 1 | 000 |
| 2 | 001 |
| 3 | 010 |
| 4 | 011 |
| 5 | 100 |

-continued

| Channel under consideration | 3 bits mapping |
|---|---|
| 6 | 101 |
| 7 | 110 |
| 8 | 111 |

| Number of channels | 4 bits mapping |
|---|---|
| illegal | 0000 |
| illegal | 0001 |
| 1 | 0010 |
| 2 | 0011 |
| 3 | 0100 |
| 4 | 0101 |
| 5 | 0110 |
| 6 | 0111 |
| 7 | 1000 |
| 8 | 1001 |
| reserved | 1010 |
| reserved | 1011 |
| reserved | 1100 |
| reserved | 1101 |
| illegal | 1110 |
| illegal | 1111 |

| Interleaver | 3 bits mapping |
|---|---|
| illegal | 000 |
| 1 frame (US) | 001 |
| 3 frames (VS) | 010 |
| 9 frames (S) | 011 |
| 18 frames (M) | 100 |
| 36 frames (L) | 101 |
| 72 frames (VL) | 110 |
| illegal | 111 |

| FEC | 3 bits mapping |
|---|---|
| illegal | 000 |
| perforated ½ CC: Y = ¾ | 001 |
| unperforated ½ CC | 010 |
| reserved | 011 |
| reserved | 100 |
| reserved | 101 |
| reserved | 110 |
| illegal | 111 |

It will be noted that some values in the tables provided are declared illegal in order to avoid any risk of confusion with the mini-probe motif, in the same way as some values are prohibited in the reference standard for the tribits for definition of the interleaver in BLU mode. Other values are presented as reserved in this case for attributions to be defined on the basis of needs.

According to the method, owing to the provided possibility of changing FEC error correction code, and not using just the ½ convolutional code punctured to a ¾ yield in the BLI version, for example, it is therefore effectively proposed that the modulation information used be conveyed on the paths, instead of the useful bit rate traditionally transmitted in the extended autobaud. This is because this modulation will moreover possibly be able to be coded, which means that it can have a repetition or coding capability to reinforce its resistance, or will simply be able to be used with the common FEC correction code, with an equal or different yield from the standard BLI yield.

The example explained above can, without departing from the scope of the invention, be implemented in any communication system that has a plurality of paths, n channels, a means allowing knowledge of the quality of the communication channels, and a frame structure comprising a set of unused bits in order to introduce at least the following information:

the bit rate used on each channel $ch_1, \ldots, ch_n$,
the interleaver under consideration, which is common to the n channels,
the correction code used, which is common to the n channels,
the number of channels used (n), and for each the identifier $id_1, \ldots, id_n$ thereof that allows them to be ordered.

More generally, the implementation of the method according to the invention is aimed at a frame structure composed of a first portion 401=401a, 401b comprising synchronization and autobaud information, followed by a data block 402, then a portion 403 comprising the error correction code.

The extended autobaud involves the introduction, at the portion 401a, 401b comprising synchronization information, of a set of information 405 corresponding to a number of symbols, this second portion being demodulated by the conventional BDFE equalizer relying on the introduction of a final mini-probe that is identical to that of the conventional autobaud (31 symbols). The extended autobaud according to the present invention can be regarded as a standard autobaud and an extension 405.

The invention notably exhibits the following advantages. It allows independent management of the various paths and thus improvement of the probability of having adapted the modulation and the coding to the conditions of the propagation channel. This makes it possible to obtain a scope and a probability of setup of the communication that are desired according to the communication system.

The extended autobaud proposal according to the invention therefore allows current stations not to be perturbed, but also the introduction of a redundancy capability in order to allow successful decoding of the frame itself in the event of loss of a channel (or a plurality of noncontiguous channels), but also allows the use of different modulations according to the channels.

The method according to the invention makes it possible to benefit from coding diversity owing to the use of a single correction code and interleaving stage between the various paths, to be able to resist at least one blocked channel owing to the specific redundancy introduced into the extended shared autobaud mechanism, and it therefore makes it possible to avoid the break in communication in the event of rapid deterioration (fading, scrambling) of one or more channels owing to the sharing of the information on all of the paths.

The method makes it possible to vary the (possibly coded) modulation on each of the paths, and thus to propose more adaptation flexibility or to provide a different point of operation for the various paths of the communication system.

The invention claimed is:

1. A method for communication in a wideband high frequency (HF) communication system comprising a transmitter for an HF signal and a receiver, at least n communication channels $ch_n$, an FEC error correction code and an interleaver that are common to the n communication channels, the system determining a communication quality Qn from measured signals provided by each of the n communication channels $ch_n$, data being transmitted in a form of a frame comprising an initial synchronization preamble and a standard autobaud followed by a block of data, wherein the method allows a use of n channels in parallel, sharing one and the same coder and one and the same interleaver to benefit from frequency diversity protection, while allowing use of different modulations on the n communication channels and providing redundancy on information pertaining to coding, interleaving, and modulation by channel, the method comprising:

introducing, into a frame of the data in the transmitted HF signal, an autobaud extension preamble after the standard autobaud, said extension preamble having at least the following information:
    a piece of information about the modulation used on each of the n communication channels $ch_n$,
    a piece of information about the interleaver that is common to the n communication channels,
    the FEC correction code used, which is common to the n communication channels, and
    the number of communication channels used (n), and for each identifier $id_n$ thereof that allows them to be ordered,
choosing the modulation on a communication channel n on a basis of a link quality of said communication channel,
operating a common coding and interleaving on the n communication channels, and
transmitting the information introduced into a shared autobaud at the receiver.

2. The method as claimed in claim 1, further comprising inserting the autobaud extension preamble after the standard autobaud that is itself regularly inserted into the data frame.

3. The method as claimed in claim 1, wherein said frame comprises a first standard portion composed of two tribits followed by a mini-probe, and a second portion made up of n tribits followed by a mini-probe.

4. The method as claimed in claim 1, wherein the information on the modulation used is a piece of bit rate information.

5. The method as claimed in claim 1, wherein a propagation channel $ch_k$ carries bit rate information for the communication channels $ch_k$ and $ch_{k+1}[n]$.

6. The method as claimed in claim 1, wherein the modulation used on a path is selected based on a quality $Q_n$ of the communication channel $ch_n$.

7. The method as claimed in claim 6, wherein a link quality of a communication channel is estimated by:

measuring power of a received signal, in an absence of communication, in each communication channel considered by the system,
attributing a quality grade to each of said channels by comparing a value measured for the power with one or more threshold values, and
selecting the n communication channels having highest grade values.

8. The method as claimed in claim 6, wherein said link quality of a communication channel is determined at the transmitter.

9. The method as claimed in claim 1, wherein a width of a communication channel is 3 kHz, 6 kHz or t kHz, t being a given real number.

10. The method as claimed in claim 1, wherein a frame structure is defined in a ST4539 standard or a MIL 188-110B standard, the method uses a value '111' of a first tribit of the autobaud to signal extended autobaud operation to the receiver, and four additional tribits are defined, or eight symbols for forming an autobaud of 137 symbols, constituting the extended autobaud, said tribits being protected by a correction code.

11. The method as claimed in claim 1, wherein various coded modulations are used based on a communication channel that is under consideration.

12. A wideband high frequency (HF) communication system, comprising:
at least one HF transmitter and at least one HF receiver configured to transmit and receive a signal having an HF waveform, wherein: said HF receiver is configured to determine n frequency channels, on which said HF receiver transmits an HF signal,
said receiver is configured to evaluate transmission quality of a channel,
said HF transmitter is configured to generate an autobaud comprising at least the following information:
    a piece of information about a modulation used on each of n communication channels $ch_n$,
    a piece of information about an interleaver that is common to said n communication channels,
    an FEC correction code used, which is common to said n communication channels, and
    a number of communication channels used (n), and for each an identifier $id_n$ thereof that allows them to be ordered,
the system further comprises a return path configured to allow the information about said quality of the channel to be sent back to the HF transmitter.

* * * * *